Aug. 18, 1970     R. C. WILLIAMS     3,524,513

VEHICLE SUSPENSION LINKAGE

Filed Sept. 12, 1968     2 Sheets-Sheet 1

INVENTOR.
Russell C. Williams
BY
C. J. Biskup
ATTORNEY

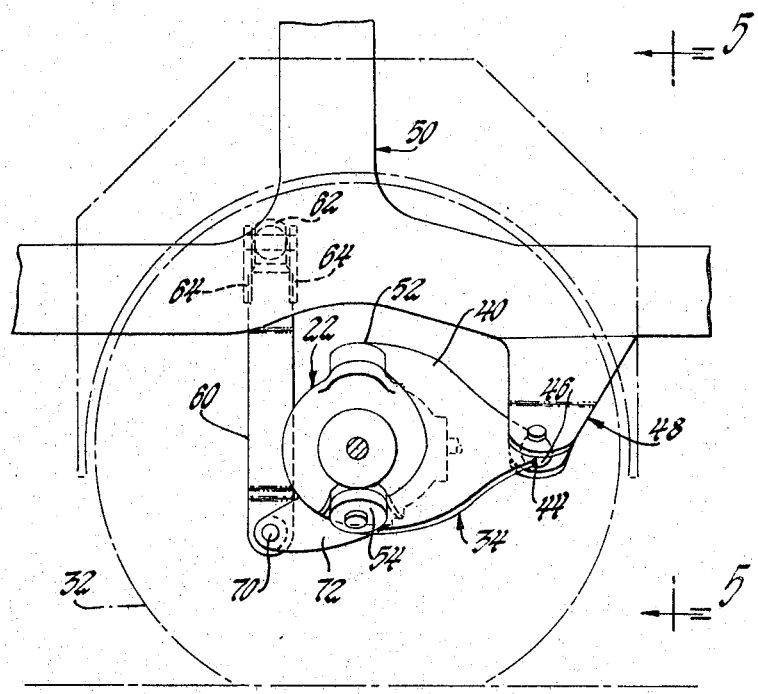
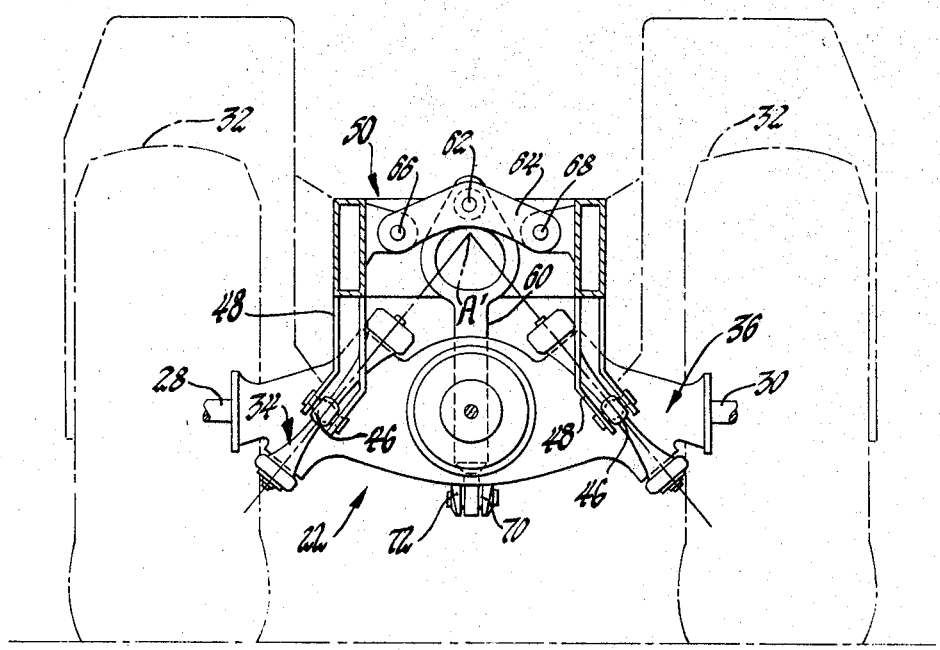

United States Patent Office 3,524,513
Patented Aug. 18, 1970

3,524,513
VEHICLE SUSPENSION LINKAGE
Russell C. Williams, Rocky River, Ohio, assignor to General Motors Corporation, Detroit, Mich., a corporation of Delaware
Filed Sept. 12, 1968, Ser. No. 759,266
Int. Cl. B60k 17/32
U.S. Cl. 180—52   6 Claims

ABSTRACT OF THE DISCLOSURE

A suspension linkage for supporting a transverse axle for oscillation about an axis extending longitudinally and centrally of a vehicle. The linkage includes first and second arms respectively located on opposite sides of the axis and also a rigid link lying in a plane passing through the axis.

---

One form of rubber-tired tractor extensively used in earth moving operations has an oscillating axle mounted at one end of the vehicle, while the other end has the associated axle rigidly secured thereto so as to provide for ground contact of all four wheels over uneven terrain. The usual practice is to place the working tool, such as the bucket, bulldozer blade or scaper bowl, adjacent to the fixed axle so as to provide required stability during the cutting and digging cycle. The present invention relates to a vehicle of this type and more particularly to a suspension linkage for supporting the movable axle for oscillation about an axis extending longitudinally of the vehicle.

Accordingly, the objects of the present invention are to provide an improved suspension linkage for an oscillating axle; to provide a vehicle suspension linkage that allows drive to be directed to an oscillating axle without interference from the axle supporting structure; to provide a nonresilient suspension system that restricts all movement of the axle except oscillation thereof about an axis extending longitudinally of the vehicle, and to provide a vehicle suspension linkage having a simple and inexpensive construction which maintains the axle stable with respect to the vehicle frame in vertical, longitudinal, and lateral directions.

Other objects and advantages of the present invention will be more apparent from the following detailed description when taken with the drawings in which:

FIG. 4 shows a suspension linkage similar to that shown in FIG. 2 except for a modification of one of the members, and FIG. 5 is a view taken on line 5—5 of FIG. 4.

Figure 1:
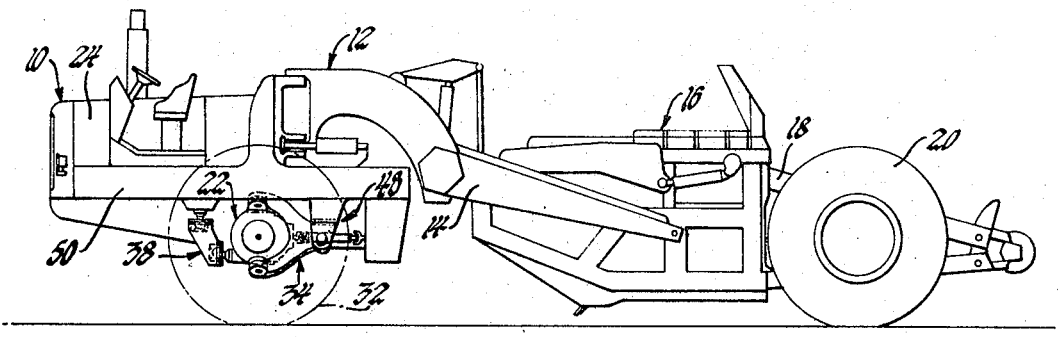
FIG. 1 shows an earth-moving vehicle incorporating a suspension linkage made in accordance with the invention.

Referring to the drawings and more particularly FIG. 1 thereof, one side of an earth-moving scraper is shown comprising an overhung tractor 10 that has the usual gooseneck portion 12 pivotally mounted thereon permitting the tractor to steer about the vertical axis as is conventional. The gooseneck portion 12 extends rearwardly for connection with laterally spaced pull arms 14, the end portions of which are pivotally connected to a trailing scraper bowl 16. The scraper bowl 16 is supported by a transversely extending axle (not shown) that is rigidly connected to the bowl frame 18 and rotatably supports ground-engaging wheels, one of which is indicated by the numeral 20. The tractor 10 similarly is supported on a transversely extending axle housing 22 which, in this case, receives drive from an engine (not shown) located within an engine compartment 24. The engine in turn is drivingly connected through suitable gearing and shafts to a stub shaft 26 that extends into the axle housing 22 and transmits drive through conventional differential gearing to oppositely extending half-axles 28 and 30, the outer ends of which rotatably support wheels 32 as seen in FIGS. 2 and 3 of the drawings.

The axle housing 22 is supported for oscillation about a longitudinally extending centrally located axis by a suspension linkage made in accordance with the invention and including a pair of laterally spaced and inclined control arms 34 and 36, and a link member 38. It will be noted that both control arms 34 and 36 are identical in size and configuration and for this reason a detailed description of control arm 34 will be given only, it being understood that corresponding portions located on control arm 36 will be identified by the same numerals.

Figure 2:
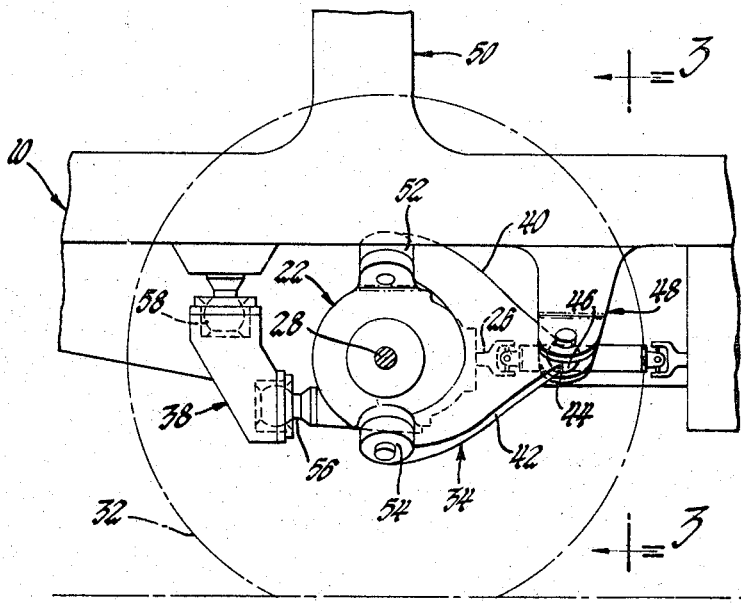
FIG. 2 is an enlarged view showing the suspension linkage incorporated with the vehicle of FIG. 1.
Figure 3:
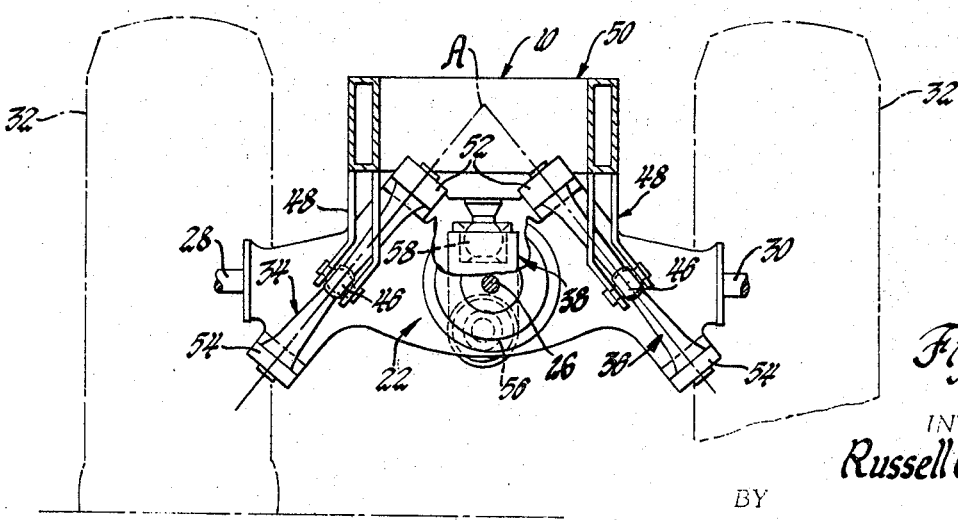
FIG. 3 is a view taken on line 3—3 of FIG. 2.

As best seen in FIGS. 2 and 3, control arm 34 comprises forwardly extending legs 40 and 42 which converge at a vertex portion 44 which is connected through a spherical pivot mounting 46 to a depending bracket 48 rigid with the frame 50 of the tractor 10. The legs 40 and 42 are respectively connected to the axle housing 22 by pivot connections 52 and 54 and the arrangement is such that, as seen in FIG. 3, the control arms 34 and 36 are located on opposite sides of an imaginary vertical plane passing through the longitudinal center of the vehicle. For a more detailed description of the control arms and the manner of their connection to the axle housing and tractor frame, attention is directed to U.S. Pat. No. 3,177,006, in the name of R. L. Knight, and issued on Apr. 6, 1965.

The forward end of the axle housing 22 rigidly supports a ball stud 56 which extends into and is retained in the lower end of the link member 38, the opposite end of which similarly accommodates and holds a ball stud 58 rigid with the tractor frame 50. Thus, by providing spherical or universal type joints at the vertex portions 44 of the control arms 34 and 36, and also between the link member 38 and forward end of the axle housing 22, the latter is thereby permitted to oscillate about an axis located substantially at a point A defined by inclined planes passing through the control arms.

It is important to note that the link member 38 lies in a vertical plane which extends through the central longitudinal axis of the vehicle and thereby cooperates with the control arms to provide stability of the axle. In this regard, it will be noted that both tractive and braking effort is resisted by each control arm inasmuch as the legs thereof are connected to the axle housing at points located above and below the axis of wheel rotation. Moreover, by placing the same pivot connections in an inclined plane, as shown in FIG. 3, lateral stability is obtained while at the same time permitting oscillation of the axle about the longitudinal axis located substantially at point A. Vertical stability is provided by link member 38 which, due to the location of the ball studs above and below the axis of wheel rotation, permits the axle housing 22 to oscillate as aforedescribed.

FIGS. 4 and 5 show a modified form of the suspension linkage described above and, accordingly, similar parts thereof are identified by the same numerals. The difference in this particular linkage is in the form of link which connects the forward end of the axle housing 22 with the vehicle tractor frame 50. In this case, it will be noted that the link member 60 takes the form of a pendulum, the upper end of which is connected by a spherical joint 62 to a strap 64 that extends laterally for connection to the tractor frame 50 by pivot connections 66 and 68. The lower end of the link member 60 is connected by a spherical joint 70 to a forwardly extending boss 72 that is rigid with the axle housing 22. As viewed in FIG. 5, the link member 60 also lies in a central plane that is vertically orientated and passes through the longitudinal axis of the vehicle. This suspension linkage also permits oscillation of the axle about an axis substantially located at the point A' which is the point at which the planes passing through the control arms intersect. As in the case of the linkage shown in FIGS. 1 and 2, this suspension linkage provides lateral, vertical, and longitudinal stability while at the same time permitting oscillation of the axle.

Various changes and modifications can be made in this construction without departing from the spirit of the invention. Such changes and modifications are contemplated by the inventor and he does not wish to be limited except by the scope of the appended claims.

I claim:

1. In combination with a vehicle having frame means supported by first and second axles located adjacent opposite ends of said frame means, each of said axles having rotatable wheels at the opposite ends thereof, said first axle extending transversely of said frame means and rigidly connected thereto, said second axle extending transversely of the frame means and being connected to the latter by a suspension linkage whereby the second axle is adapted to move about an axis extending centrally and longitudinally of the vehicle, said suspension linkage comprising first and second arms each located between a wheel and a vertical longitudinal plane passing through said axis, said arm being positioned to one side of said second axle and lying in planes intersecting said vertical plane, means pivotally connecting each of said arms between the second axle and said frame means, a rigid substantially vertically orientated link member positioned on the other side of said second axle and lying in said vertical plane, and means pivotally connecting the opposite ends of said link member between said second axle and said frame means.

2. In combination with an earth-moving vehicle having a pair of frame sections interconnected about a vertical axis for relative articulation, one of said frame sections supporting an earth-moving implement and having a first transverse wheel-carrying axle rigidly connected thereto, the other of said frame sections having an engine for propelling the vehicle, a suspension linkage connected to said other of said frame sections and supporting a second transverse wheel-carrying axle for movement about an axis extending longitudinally of the vehicle, said suspension linkage comprising first and second control arms respectively located on each side of a vertical longitudinal plane passing through said longitudinal axis, said control arms being positioned to one side of said second axle and lying in planes intersecting said vertical plane, means pivotally connecting each of said control arms between the second axle and the other of said frame sections, a rigid link member positioned on the other side of said second axle between said control arms and lying in said vertical plane, and means pivotally connecting the opposite ends of said link member between said second axle and the other of said frame sections.

3. The combination of claim 2 wherein said control arms are located in inclined planes that intersect above the axis of wheel rotation.

4. The combination of claim 2 wherein each of said control arms is pivotally connected to the associated axle above and below the axis of wheel rotation.

5. In combination with an earth-moving vehicle having a pair of frame sections interconnected about a vertical axis for relative articulation, one of said frame sections supporting an earth-moving implement and having a first transverse wheel-carrying axle rigidly connected thereto, the other of said frame sections having an engine for propelling the vehicle, a suspension linkage connected to said other of said frame sections and supporting a second transverse wheel-carrying axle for movement about an axis extending longitudinally of the vehicle, said suspension linkage comprising first and second control arms respectively located on each side of a vertical longitudinal plane passing through said longitudinal axis, said control arms being positioned to one side of said second axle and being located in inclined planes that intersect above the axis of wheel rotation, means pivotally connecting each of said control arms between the second axle and the other of said frame sections, a rigid link member positioned on the other side of said second axle between said control arms and lying in said vertical plane, and means pivotally connecting the opposite ends of said link member between said second axle and the other of said frame sections, said last mentioned means including a horizontally extending boss rigid with said second axle and providing a spherical connection with one end of said link member, and a strap fixed to the associated frame section for providing a spherical connection with the other end of said link member.

6. The combination with an earth-moving vehicle having a pair of frame sections interconnected about a vertical axis for relative articulation, one of said frame sections supporting an earth-moving implement and having a first transverse wheel-carrying axle rigidly connected thereto, the other of said frame sections having an engine for propelling the vehicle, a suspension linkage connected to said other of said frame sections and supporting a second transverse wheel-carrying axle for movement about an axis extending longitudinally of the vehicle, said suspension linkage comprising first and second arms respectively located on each side of a vertical longitudinal plane passing through said longitudinal axis, said arms being positioned to one side of said second axle, means pivotally connecting each of said arms between the second axle and the other of said frame sections, a rigid substantially vertically orientated link member positioned on the other side of said second axle between said arms and lying in said vertical plane and means pivotally connecting the opposite ends of said link member between said second axle and the other of said frame sections, said latter mentioned means including a first ball stud member fixed to and extending horizontally from said second axle, and a second ball stud member fixed to and extending vertically from said other of said frame sections.

References Cited

UNITED STATES PATENTS 2,760,786    8/1956    Kolbe.
3,177,006    4/1965    Knight _____ 280—124

A. HARRY LEVY, Primary Examiner

U.S. Cl. X.R.

180—11; 280—111